UNITED STATES PATENT OFFICE.

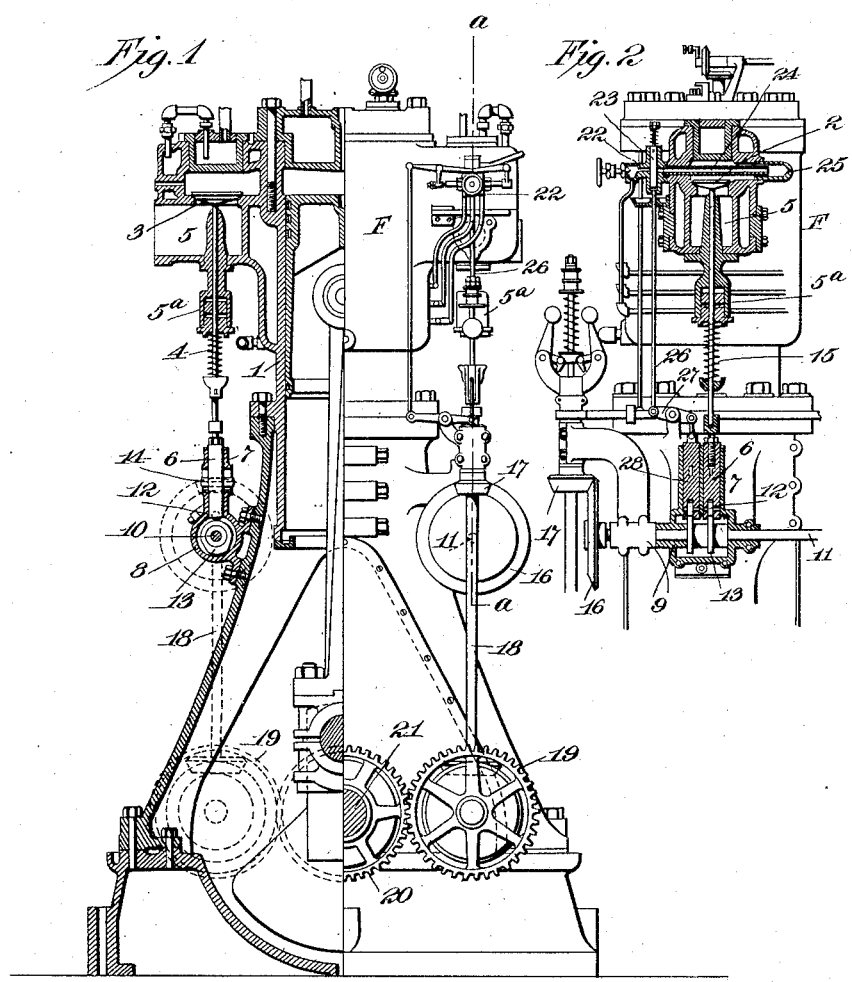

PHILIP DEVEREUX JOHNSTON, OF COLD SPRING, NEW YORK, ASSIGNOR TO AMERICAN OIL ENGINE COMPANY, A CORPORATION OF NEW YORK.

VALVE-OPERATING MECHANISM.

No. 905,435.      Specification of Letters Patent.      Patented Dec. 1, 1908.

Original application filed August 17, 1906, Serial No. 330,971. Divided and this application filed May 17, 1907. Serial No. 374,268.

*To all whom it may concern:*

Be it known that I, PHILIP DEVEREUX JOHNSTON, a citizen of the United States, residing in the village of Cold Spring, county of Putnam, and State of New York, have invented a certain new and useful Improvement in Valve-Operating Mechanisms, of which the following is a specification.

This invention relates particularly to the valves and valve gearing of internal combustion and other engines, by means of which the parts are rendered more accessible, wear may be provided for and positiveness of operation, and cheapness of construction secured. These and other objects will appear from the following specification and accompanying drawings.

One means of carrying out my invention is illustrated in the accompanying drawings, in which Figure 1 is an end view of an engine embodying my invention, one-half being an elevation, and the other half being a vertical section, the vertical section being through the exhaust valve, and Fig. 2 is a sectional view of the parts shown in Fig. 1 taken on the line *a—a*, such section being through the admission valve.

In both views like parts are designated by the same reference characters.

The broad principle upon which my engine operates is described and claimed in my application for patent Serial No. 325,110 filed July 7, 1906. The general construction of the frame illustrated in Fig. 1 is disclosed in my application for patent Serial No. 330,971, filed August 17, 1906, of which the present application is a division.

The present application for patent relates specifically to the valves and valve gearing. While it is best applied to the engine, of the type disclosed in the before identified applications for patent, many of the features of the invention may be applied in other situations.

The cylinder F is provided with an admission valve 2 (Fig. 2) and an exhaust valve 3 (see Fig. 1). The admission valve is on one side of the cylinder, and the exhaust valve on the other, and each is actuated by a separate shaft. This construction renders the valve mechanism very accessible. The valves are substantially alike except as to size. A description of one will be a description of the other.

As shown, each valve is mounted upon a stem 4, which is mounted within a bearing in the valve chamber 5 and passes through a guide and a cushioning cylinder 5ª, the object of which is to prevent the slamming of the valve when seated. The end of the stem is adjustably secured to a block 6, which is arranged to vertically slide within a casing 7, connected to the bearing 8 or 9 of the shaft 10 or 11. The lower end of the block 6 is provided with a roller 12, which engages with the cam 13, mounted upon the shaft 10 or 11. A pin 14 prevents rotation of the block 6. A spring 15 insures the seating of the valve. Each of the shafts 10 and 11 carries a beveled gear 16 at one extremity, which gears are engaged by beveled pinions 17, carried by the vertical shafts 18. These shafts carry near their lower ends beveled gears driven from shafts carrying the spur gears 19. These spur gears mesh with the spur gear 20, which is carried by the crank shaft 21. The proportion of the gears is such that the shafts 10 and 11 will turn at half the speed of the crank shaft 21, so that the valves will be actuated at every other stroke of the engine, as is necessary in a 4-stroke or 4-cycle engine. If the invention is applied to a 2-stroke or other form of engine working upon a different cycle, the proportion of speed will be varied accordingly.

A mixing chamber 22 is attached to the side of the admission valve chamber. The explosive mixture is generated within this chamber in any manner, but preferably in the manner disclosed in my co-pending applications, Serial No. 330,971, filed August 17, 1906, and No. 325,110, filed July 7, 1906. A cut off valve 23 controls communication from the mixing chamber to the inlet valve chamber, the passage including a tube 24, which extends through the valve chamber above the inlet valve and through an opening in the other side of the valve chamber into a casing or cover 25. The tube 24 is best made of wrought iron so that it will, when subjected to the contact of burning gases within the chamber, become hot and assist in the vaporization of the charge composed of oil, air and water. This tube 24 varies in length according to the character of the fuel used. It is made to extend through the opposite wall of the valve chamber and into the casing or cover 25, so that a sufficient length of tube will be secured.

The cut off valve 23 is a slide valve and is actuated by a rod 26, which connects through a short lever 27 to a block 28, which block is preferably of the same size and shape as the block 6 already described in connection with the inlet and outlet tube operative mechanism. The block 28 is carried with a casing, similar in all respects to the casing containing the inlet and outlet valves operating block, and is actuated in the same manner by a cam on the shaft 11. The casings for the two blocks are preferably cast integrally with the bearing 9 for the shaft 11, so that a small, good and compact construction is produced. The cam which operates the cut off valve 23 is so timed as to move the latter at the proper moment.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

In an internal combustion engine, the combination of an inlet valve and a cut off valve, and a shaft for actuating the two, the said shaft having cams, a casing surrounding the cams, and a bearing for the shaft, the said bearing being carried by the casing and formed integrally thereunto, blocks sliding within the casing, the said blocks engaging with the cams, there being connections between the blocks and the valves.

This specification signed and witnessed this 14th day of May, 1907.

PHILIP DEVEREUX JOHNSTON.

Witnesses:
 JAS. F. COLEMAN,
 JOHN L. LOTSCH.